United States Patent [19]

Tanaka et al.

[11] Patent Number: 4,847,912
[45] Date of Patent: Jul. 11, 1989

[54] METHOD OF DETECTING A SPACE BETWEEN WORDS WITH OPTICAL CHARACTER READER

[75] Inventors: Hideaki Tanaka, Osaka; Morihiro Katurada, Nara; Minehiro Konya, Osaka, all of Japan

[73] Assignee: Sharp Kabushiki Kaisha, Osaka, Japan

[21] Appl. No.: 133,531

[22] Filed: Dec. 16, 1987

[30] Foreign Application Priority Data

Dec. 23, 1986 [JP] Japan .................................. 61-310412

[51] Int. Cl.⁴ .............................................. G06K 9/34
[52] U.S. Cl. .......................................... 382/9; 382/18; 382/51
[58] Field of Search .......................... 382/9, 11, 18, 51

[56] References Cited

U.S. PATENT DOCUMENTS

| | | | |
|---|---|---|---|
| 4,481,665 | 11/1984 | Ota ......................................... | 382/9 |
| 4,594,732 | 6/1986 | Tsuji ...................................... | 382/18 |
| 4,635,290 | 1/1987 | Tsuji et al. .............................. | 382/9 |
| 4,742,556 | 5/1988 | Davis, Jr. et al. ..................... | 382/18 |

Primary Examiner—Leo H. Boudreau
Assistant Examiner—Yonnie Jung
Attorney, Agent, or Firm—Flehr, Hohbach, Test, Albritton & Herbert

[57] ABSTRACT

According to a method of the present invention, an optical alphanumeric character reader scans each printed line in the direction of its height from its beginning to its end sequentially at a predetermined interval. The intervals thus scanned are identified either as containing a printed part or as being all white and are represented respectively by a "black bit" and a "white bit" corresponding to different logical numbers. For each white bit or each continuous array of white bits sandwiched between black bits, the number of white bit or bits between the sandwiching black bits is counted. The histogram of such counted numbers has two peaks corresponding to gaps between letters and those between words and serves to determine a threshold value by which a space between words can be detected by the optical character reader.

3 Claims, 3 Drawing Sheets

A  B
It has been recognized for some time
FIG. — 3
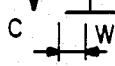
0 0 1 0 0 0 1 1 1 1 0 0 0 0 1 0 0 0 0 1 0 0 0 1
FIG. — 4

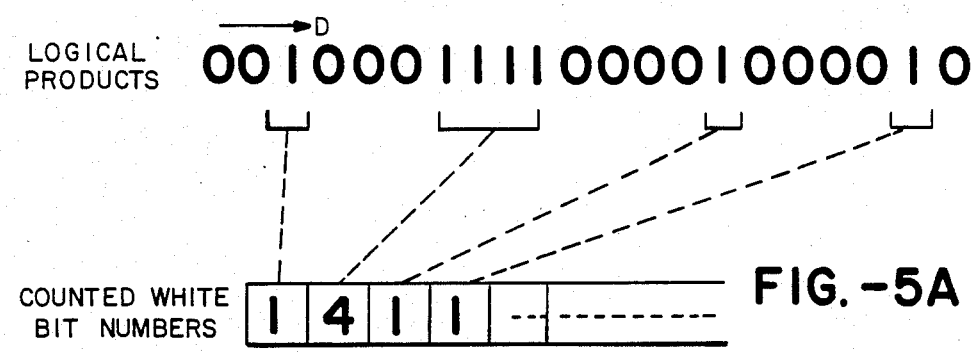
FIG.-5A
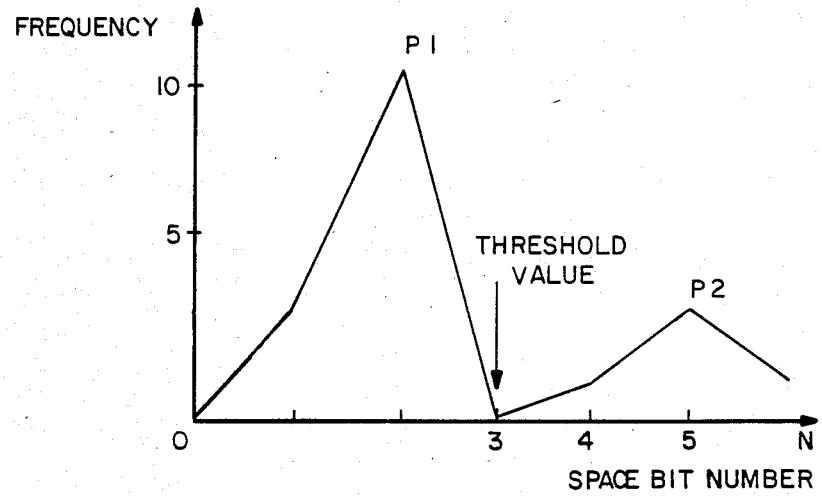
FIG.-5B
FIG.-6

METHOD OF DETECTING A SPACE BETWEEN WORDS WITH OPTICAL CHARACTER READER

BACKGROUND OF THE INVENTION

This invention relates to a method of detecting the space between printed words by using an optical alphanumeric character reader.

According to the conventional method of using an optical alphanumeric character reader, the space between two mutually adjacent words is identified on the basis of a threshold value which, if a document printed with a fixed pitch is inputted, is obtained from this pitch and, if the inputted document has been prepared by left-justifying and right-justifying each line and uniformizing the distances between each pair of mutually adjacent words, is obtained from a value representing the line height. In general, most printed documents are both left-justified and right-justified rather than have a fixed pitch, but the aforementioned conventional method of determining the space between words is frequently not satisfactory especially if the separation between words changes for the same line height or varies significantly within the same line or if there are variations in the space between neighboring letters. This is basically because the conventional method of determining an optimum threshold value from the line height is not adequate. If the space between words fails to be accurately recognized, the beginning of a word may be identified incorrectly and this causes a spell check and other subsequent word identification processes to become invalid and useless.

SUMMARY OF THE INVENTION

It is therefore an object of the present invention to provide a method of accurately detecting the space between printed words by an optical alphanumeric character reader such that the beginning of a word can be accurately identified and that a spell check and other word recognition processes to be subsequently carried out will not prove wasteful.

According to a method of the present invention by which the above and other objects can be achieved, each printed line is scanned by an image scanner in the direction of the line height from the beginning to the end of the line at a predetermined interval. Each of scanned interval is identified either as containing a printed area or as being completely white and this information is stored in a memory device respectively as a black bit and a white bit. For each white bit or a continuous array of white bits sandwiched between black bits, the number of the sandwiched white bit or bits is counted and a histogram of such counted numbers is prepared. The histogram contains a first peak representing gaps between letters and a second peak representing gaps between words. A desired threshold value by which a space between words is detected according to the present invention is determined as the value represented by the valley between these peaks.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 3 shows a printed line to be scanned, FIG. 4 is an enlarged view of a portion of FIG. 3, FIGS. 5A and 5B are data stored in the buffer of the optical character reader of FIG. 1, and FIG. 6 is a histogram of space bit numbers.

DETAILED DESCRIPTION OF THE INVENTION

Figure 1:
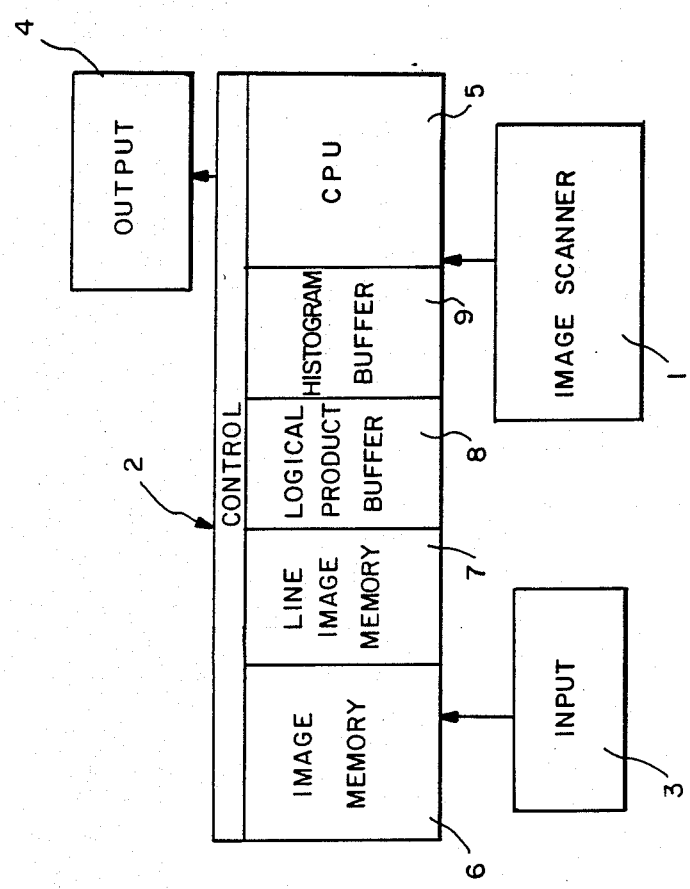
FIG. 1 is a schematic block diagram of an optical alphanumeric character reader which makes use of a method of the present invention.

With reference first to FIG. 1 which is a schematic block diagram of an optical character reader, numeral 1 indicates an image scanner serving as its photoelectric conversion section for reading characters and converting them into image signals, numeral 2 indicates a control unit serving as its logical recognition section for processing the image signals outputted from this image scanner 1, numeral 3 indicates an input device for inputting control signals and the like into this control unit 2 and numeral 4 indicates an output device for displaying characters and the like read by the control unit 2.

The control unit 2 is comprised of a central processing unit (CPU) 5 which controls the logical recognition section to process the image signals, an image memory 6 for storing image signals outputted from the image scanner 1, a line image memory 7 for storing image data corresponding to one line extracted from this image memory 6 by the CPU 5, a logical product buffer 8 for storing the logical product in the vertical direction (to be explained in detail below) obtained by the CPU 5 from the data stored in the line image memory 7, and a histogram buffer 9 for storing values representing the frequencies of appearance of numbers each representing the length of unprinted space calculated by the CPU 5 on the basis of the data stored in the logical product buffer 8 (also to be explained in detail below). A method of the present invention for detecting a space between printed words by using the optical character reader structured as shown in FIG. 1 is explained next by way of the flow chart shown in FIG. 2 with additional reference to FIGS. 3 through 6.

Let us consider a uniformly printed line as shown in FIG. 3 which is both left-justified and right-justified between the fixed left-hand and right-hand margins A and B and in which each pair of mutually adjacent words is separated by a uniform distance S. Firstly, the image scanner 1 scans the line from the left-margin A to the right-margin B in the direction of the line height (indicated by Arrow C), each time scanning a width shown by W. After each scan, a 16-bit binary image signal with "1" and "0" respectively indicating white and black is outputted to the control unit 2 and such outputted image signals are all stored in the image memory 6. Next, the CPU 5 extracts therefrom a portion of the stored image signal in the image memory 6 corresponding to one line (such as the one shown in FIG. 3). After this extracted portion is separately stored in the line image memory 7, the CPU 5 obtains the logical products of the 16-bits of these image data and sequentially stores the results in the logical product buffer 8 as shown in FIG. 4 in terms of "0" (or "black bit") indicating that a black section was detected by that scan and "1" (or "white bit") indicating that the scanned area was all white.

After a result for one line is thus stored in the logical product buffer 8, the CPU 5 begins to examine this buffer 8 sequentially from the left-hand end as shown by Arrow D in FIG. 5A and the number of white bits (or "white bit number") in a continuous array sandwiched between black bits "0" on both sides is counted as shown also in FIG. 5A. The results of this counting process are referred to as space bit numbers N and the frequency of appearance of each space bit number is recorded as shown in FIG. 5B. The frequency numbers are zero at the left-hand end of the series of numbers shown in FIG. 5A but as the counting is continued along Arrow D, a corresponding frequency number is incremented each time by one.

A histogram as shown in FIG. 6 is thus obtained from the counted frequencies of appearance of space bit numbers N. This histogram usually has a first peak $P_1$ (at $N=2$ according to FIG. 6) corresponding to the gaps between letters and a second peak $P_2$ (at $N=5$ according to FIG. 6) corresponding to the gaps between words, having a valley therebetween (at $N=3$ with frequency zero according to FIG. 6). The CPU 5 analyzes such a histogram and identifies the space bit number $N=3$ corresponding to this valley as the threshold value.

After a threshold value is thus established, the CPU 5 examines once again the data stored in the logical product buffer 8 and, whenever a white bit number greater than this threshold value is detected, concludes that this represents a space between two words, concluding otherwise in other cases.

Figure 2:
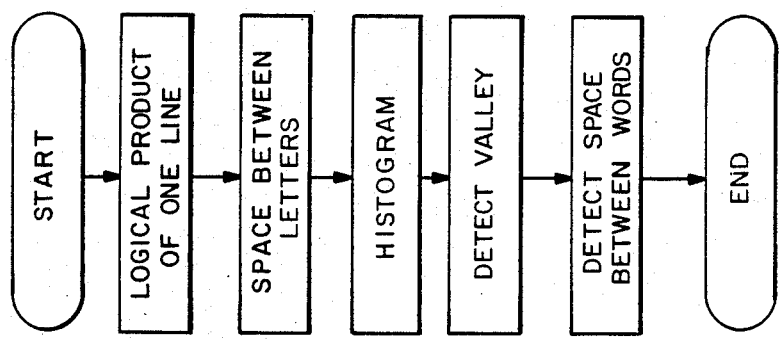
FIG. 2 is a flow chart of the method of the present invention.

The aforementioned procedure represented by the flow chart of FIG. 2 is repeated for each line. With a method of the present invention described above, the beginning of each word can be identified with improved accuracy and processes such as a spell check performed after words are identified can be carried out with increased reliability. Although the description of the present invention given above related to an example wherein each line is printed with equal spacing S between each mutually adjacent pair of words, the method of the present invention can be effectively applicable, for example, to a line printed with a uniform pitch.

What is claimed is:

1. A method of detecting a space between words with an optical alphanumeric character reader comprising the steps of
   scanning each extracted line in the direction of its height sequentially from its beginning to its end with said optical character reader, thereby obtaining binary signals of a predetermined number of bits, each of said bits representing black or white,
   identifying each of said binary signal as a white bit if said bits of said signal are all white and as a black bit if otherwise,
   storing said identified white and black bits sequentially in a memory device,
   counting, and identifying as a space bit number, the number of each white bit and each continuous array of white bits sandwiched between black bits in said memory means,
   forming a histogram of said space bit numbers having a valley containing a zero point therein between a first peak corresponding to gaps between letters and a second peak corresponding to gaps between words,
   determining a threshold value corresponding to said zero point, and
   detecting a space between words on the basis of said threshold value.

2. The method of claim 1 wherein said memory device stores each of said white bits as a first logical number and each of said black bits a second logical number.

3. The method of claim 1 wherein said predetermined number of bits is 16.

* * * * *